(12) United States Patent
Hashigami et al.

(10) Patent No.: US 8,000,596 B2
(45) Date of Patent: Aug. 16, 2011

(54) CAMERA BODY AND IMAGING APPARATUS

(75) Inventors: Koji Hashigami, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/713,383

(22) Filed: Feb. 26, 2010

(65) Prior Publication Data

US 2010/0220989 A1 Sep. 2, 2010

(30) Foreign Application Priority Data

Feb. 27, 2009 (JP) ................................. 2009-045619

(51) Int. Cl.
*G03B 7/00* (2006.01)
*G03B 7/097* (2006.01)

(52) U.S. Cl. ....................................... 396/235; 396/257

(58) Field of Classification Search .................. 396/235, 396/236, 238, 239, 242, 257
See application file for complete search history.

(56) References Cited

U.S. PATENT DOCUMENTS

| | | | | |
|---|---|---|---|---|
| 4,882,602 A | * | 11/1989 | Tanaka et al. | 396/235 |
| 5,455,685 A | * | 10/1995 | Mori | 348/363 |
| 5,459,512 A | * | 10/1995 | Kawahara | 348/363 |

FOREIGN PATENT DOCUMENTS

| | | |
|---|---|---|
| JP | 2002-290828 | 10/2002 |
| JP | 2005-084339 | 3/2005 |
| JP | 2006-215310 | 8/2006 |
| JP | 2007-006305 | 1/2007 |
| JP | 2009-017272 | 1/2009 |
| JP | 2009-258481 | 11/2009 |

* cited by examiner

*Primary Examiner* — Clayton E LaBalle
*Assistant Examiner* — Dennis Hancock
(74) *Attorney, Agent, or Firm* — Panasonic Patent Center; Dhiren Odedra; Kerry Culpepper

(57) ABSTRACT

A camera body includes an imaging unit for generating image data from an optical signal incident via the interchangeable lens, a detector for detecting a light quantity of the optical signal, a controller for setting an aperture value of a diaphragm of the interchangeable lens and an exposure condition which is a setting relating to exposure other than a setting of the diaphragm, a sending unit for sending a control signal for control with the set aperture value to the interchangeable lens, and a mode setting unit for selecting one from a plurality of operating modes. The plurality of operating modes includes a first mode for automatically adjusting the aperture value of the diaphragm and the exposure condition according to the detected light quantity during capturing of a moving image, and a second mode for automatically adjusting the aperture value with the exposure condition being fixed according to the detected light quantity during capturing of the moving image. An average drive speed of the diaphragm for automatically adjusting the aperture value in the second mode is slower than that in the first mode.

8 Claims, 11 Drawing Sheets

Fig. 6B
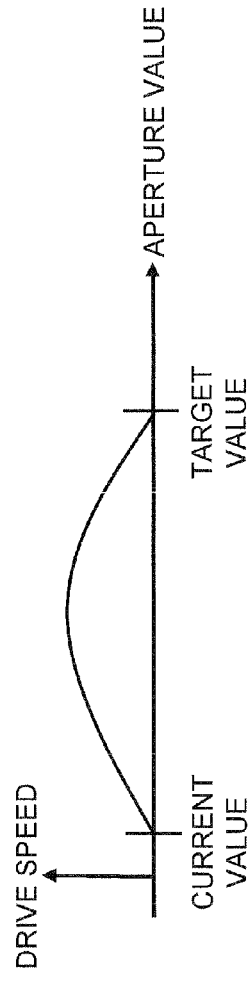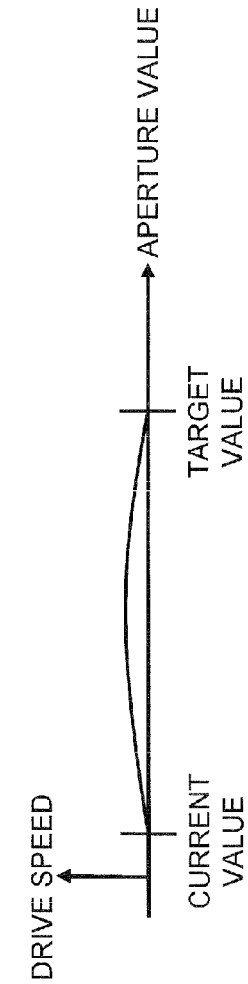
(2) CONTROL BY ADJUSTING DRIVE SPEED
(a) AT SPEED Y2
(b) AT SPEED Y1

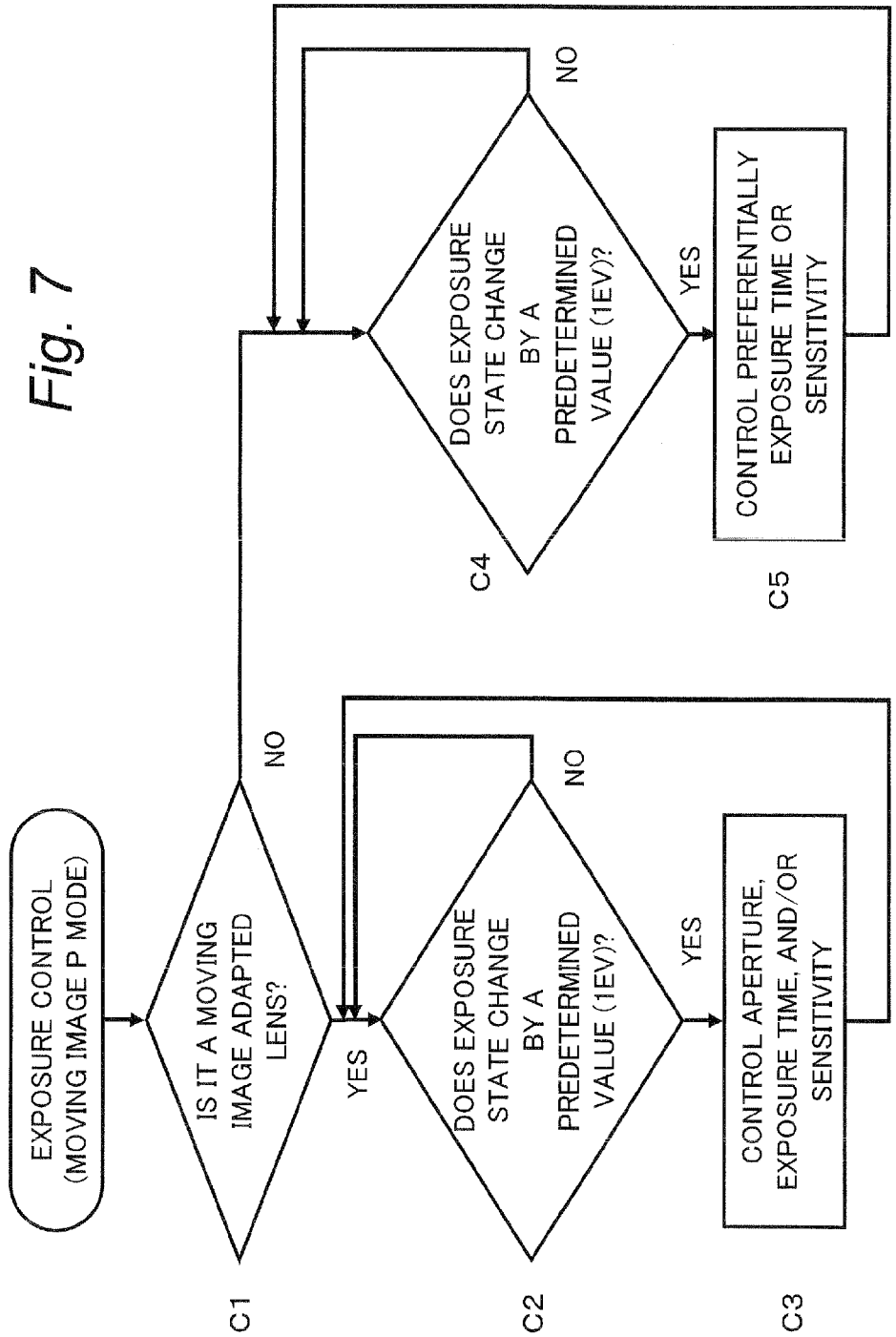

CAMERA BODY AND IMAGING APPARATUS

BACKGROUND

1. Technical Field

The technical field relates to an imaging apparatus for capturing a subject and generating image data, and more particularly to an imaging apparatus capable of automatically adjusting a diaphragm (an aperture).

2. Related Art

JP 2006-215310 A discloses a camera body to which an interchangeable lens can be mounted. An intermediate adapter connectable to the interchangeable lens can be attached to this camera body. When attached with the intermediate adapter and capturing a subject to generate image data, the camera body can perform smooth AE control among the sequentially generated image data. Specifically, the camera body sends a target video signal level and a detected video signal level to the intermediate adapter. The intermediate adapter determines a drive amount and a drive speed of the diaphragm of the interchangeable lens according to a difference between the target video signal level and the detected video signal level. Thereafter, the intermediate adapter sends the drive amount and the drive speed to the interchangeable lens. As a result, when the diaphragm is controlled based on the received drive amount and drive speed, the interchangeable lens enables smooth exposure control with less change in brightness among the image data.

When the exposure is abruptly controlled at the time of shooting a moving image, the brightness of the imaged moving image abruptly changes among frames, and thus the imaged moving image becomes an uncomfortable image to a user.

SUMMARY

To solve the above problem, an imaging apparatus is provided, which can suitably control a suitable exposure to shoot a moving image preferable to a user.

In a first aspect, there is provided a camera body to which an interchangeable lens can be attached. The camera body includes an imaging unit for generating image data from an optical signal incident via the interchangeable lens, a detector for detecting a light quantity of the optical signal incident via the interchangeable lens, a controller for setting an aperture value of a diaphragm of the interchangeable lens and an exposure condition which is a setting relating to exposure other than a setting of the diaphragm, a sending unit for sending a control signal for control with the aperture value set by the controller, to the interchangeable lens, and a mode setting unit for selecting one operating mode from a plurality of operating modes. The plurality of operating modes includes a first mode for automatically adjusting the aperture value of the diaphragm and the exposure condition according to the light quantity detected by the detector during capturing of a moving image, and a second mode for automatically adjusting the aperture value of the diaphragm with the exposure condition being fixed according to the light quantity detected by the detector during capturing of the moving image. An average drive speed of the diaphragm for automatically adjusting the aperture value of the diaphragm in the second mode is slower than an average drive speed of the diaphragm for automatically adjusting the aperture value of the diaphragm in the first mode.

According to the above constitution, the drive speed of the diaphragm (namely, a rate of change in an aperture) in the second mode can be made to be slower than that in the first mode, thereby preventing an abrupt change in the exposure at the time of capturing a moving image. Therefore, an abrupt change in the brightness among frame images of the moving image does not occur, so that a moving image preferable to a user can be obtained.

For example, in the first mode, both an aperture and an exposure time are automatically controlled for the exposure control, and in the second mode, only the aperture is automatically controlled with the exposure time being fixed for the exposure control, under the condition that sensitivity of an imaging device is fixed. In general, a resolution for the control of the aperture is lower than a resolution relating to the control of the exposure time. That is, the exposure time can be controlled in smaller unit than that of the aperture.

The camera body which is set to the first mode controls the exposure time as well as the aperture when controlling the exposure in the shooting of a moving image. Therefore, even when the diaphragm is driven at a high speed for controlling the diaphragm to open more widely, the camera body can change slowly a rate of a change in light quantity incident to the imaging device, by adjusting the exposure time finely. That is, in the first mode, the diaphragm is driven at a high speed and the exposure time is shortened, so that the light quantity to the imaging device can be gradually changed.

On the other hand, if the camera body is set to the second mode, the camera body does not control the exposure time but controls only the aperture when the exposure is controlled at the time of shooting a moving image. Therefore, when the diaphragm is driven at a high speed for the exposure control, the exposure state abruptly changes, and thus a preferable moving image cannot be obtained. Therefore, in this aspect, the drive speed of the diaphragm in the second mode is made to be slower than that in the first mode, so that the abrupt change in the exposure state is prevented. As a result, a preferable moving image can be obtained.

In a second aspect of the present invention, there is provided an imaging apparatus. The imaging apparatus includes an optical system including a diaphragm, a diaphragm driver for driving the diaphragm, an imaging unit for generating image data from an optical signal incident via the optical system, a detector for detecting a light quantity of the optical signal incident via the optical system, a controller for setting an aperture value of the diaphragm and an exposure condition which is a setting relating to exposure other than a setting of the diaphragm, and a mode setting unit for selecting one operating mode from a plurality of operating modes. The plurality of operating modes includes a first mode for automatically adjusting the aperture value of the diaphragm and the exposure condition according to the light quantity detected by the detector during capturing of a moving image, and a second mode for automatically adjusting the aperture value of the diaphragm with the exposure condition being fixed according to the light quantity detected by the detector during capturing of the moving image. An average drive speed of the diaphragm for adjusting the aperture value of the diaphragm in the second mode is slower than an average drive speed of the diaphragm for adjusting the aperture value of the diaphragm in the first mode.

According to the above aspects, in the mode in which only the aperture (diaphragm) is automatically adjusted for the exposure control, the abrupt change in the exposure when capturing a moving image can be prevented. Therefore, the abrupt change in the brightness does not occur among the frame images of the moving image, so that the moving image preferable to the user can be obtained.

BRIEF DESCRIPTION OF DRAWINGS

FIG. 6B is a diagram describing a drive speed of a diaphragm (control by adjusting drive speed).

FIG. 7 is a flowchart illustrating an exposure control operation in a moving image P mode according to the first embodiment.

DETAIL DESCRIPTION OF PREFERRED EMBODIMENT

First Embodiment

The preferred embodiment is described below with reference to the drawings. This embodiment describes an example applied to a digital camera 1. It is noted that a term "capture" means an operation for generating image data from an optical signal by an imaging device, and a term "shoot" means an operation for performing a predetermined imaging process to the image data generated by the imaging device and then recording the image data in a predetermined recording medium.

1. Configuration
1-1. Outline of the Entire Configuration

Figure 1:
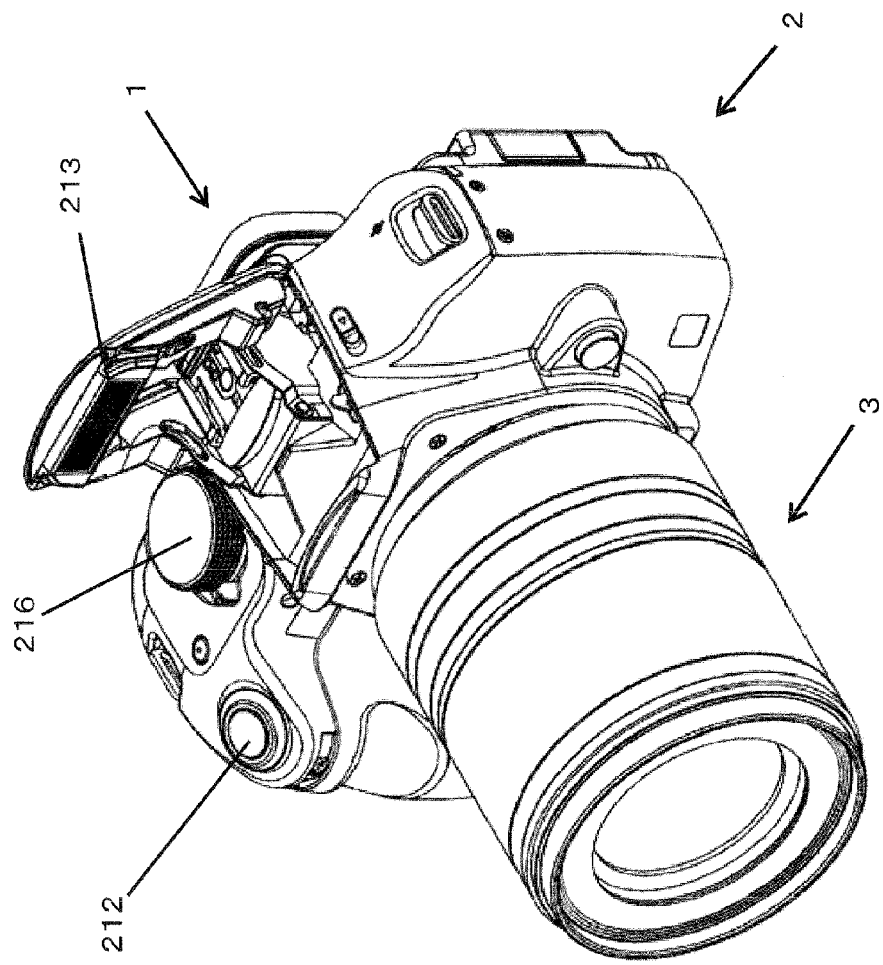
FIG. 1 is a perspective view illustrating a digital camera 1 according to a first embodiment.
Figure 2:
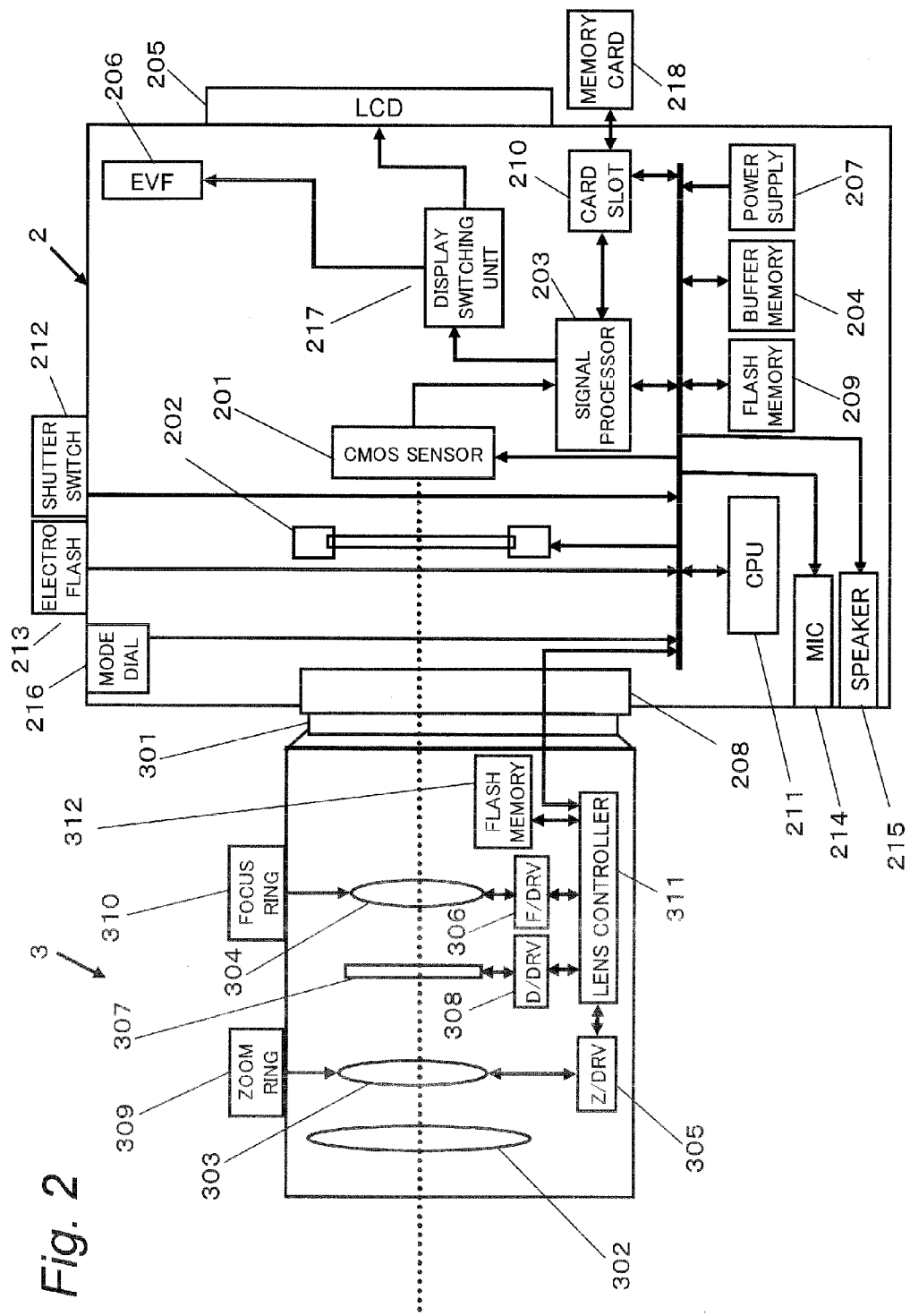
FIG. 2 is a diagram illustrating an example of a configuration of the digital camera according to the first embodiment.

FIG. 1 is a perspective view illustrating a digital camera according to the embodiment. FIG. 2 is a diagram illustrating a configuration of the digital camera according to the embodiment.

The digital camera 1 according to the embodiment includes a camera body 2 and an interchangeable lens 3 mountable to the camera body 2.

The camera body 2 includes a CMOS sensor 201, a shutter 202, a signal processing processor 203 (DSP), a buffer memory 204, a liquid crystal display (LCD) monitor 205, an electronic viewfinder 206 (EVF), a power supply 207, a body mount 208, a flash memory 209, a card slot 210, a CPU 211, a shutter switch 212, an electronic flash 213, a microphone 214, a speaker 215, and a mode dial 216.

The interchangeable lens 3 includes a lens mount 301, a lens system containing a zoom lens 303 and a focus lens 304, a zoom driver 305 for driving the zoom lens 303, a focus driver 306 for driving the focus lens 304, a diaphragms 307, a diaphragm driver 308 for driving the diaphragm 307, a zoom ring 309, a focus ring 310, a lens controller 311, and a flash memory 312. The configuration is detailed below.

1-2. Configuration of the Camera Body

The camera body 2 is configured to capture a subject image collected by the lens system of the interchangeable lens 3 and record the subject image as image data.

The CMOS sensor 201 includes a light-receiving element, AGC (gain control amplifier) and an AD converter. The light-receiving element converts an optical signal collected by the lens system into an electric signal to generate image data. The AGC amplifies the electric signal output from the light-receiving element. The AD converter converts the electric signal output from the AGC into a digital signal. The CMOS sensor 201 performs various operations such as exposure, transferring, and electronic shutter according to control signals received from the CPU 211. The various operations can be realized by a timing generator, or the like. The electronic shutter adjusts light-receiving time (capturing time) in the light-receiving element per frame.

The mechanical shutter 202 shuts off or passes the optical signal incident to the CMOS sensor 201 via the lens system. The mechanical shutter 202 is driven by a driver of the mechanical shutter 202. The driver of the mechanical shutter 202 is realized by mechanical elements such as a motor and a spring, and drives the mechanical shutter 202 under the control of the CPU 211. In short, the mechanical shutter 202 is opened and closed to temporary regulate a quantity of light emitted to the CMOS sensor 201.

The signal processing processor 203 (DSP) performs a predetermined image process to the image data converted into the digital signal by the AD converter. As the predetermined image process, gamma conversion, YC conversion, an electronic zoom process, a compression process, an expansion process and the like are considered, but not limited thereto.

When the signal processing processor 203 executes the process and when the CPU 211 executes the control process, the buffer memory 204 serves as a work memory. The buffer memory 204 can be realized by, for example, DRAM or the like.

The LCD monitor 205 is arranged on a rear surface of the camera body 2 and can display image data generated by the CMOS sensor 201 or the image data subjected to the predetermined process. Here, an image signal to be input to the LCD monitor 205 is converted from a digital signal to an analog signal by the DA converter, when the image signal to be input to the LCD monitor 205 is output from the signal processing processor 203 to the LCD monitor 205.

The electronic viewfinder 206 is arranged in the camera body 22 and can display image data generated by the CMOS sensor 201 or the image data subjected to the predetermined process. Similarly, an image signal to be input to the electronic viewfinder 206 is converted from a digital signal to an analog signal by the DA converter when the image signal to be input to the electronic viewfinder 206 is output from the signal processing processor 203 to the electronic viewfinder 206.

The display of the LCD monitor 205 and the electronic viewfinder 206 is switched by a display switching unit 217. That is, while an image is being displayed on the LCD monitor 205, nothing is displayed on the electronic viewfinder 206. Further, while an image is being displayed on the electronic viewfinder 206, nothing is displayed on the LCD monitor 205. The display switching unit 217 can be realized by a physical device such as a selection switch. For example, when the signal processing processor 203 is electrically connected to the LCD monitor 205, the selection switch may be switched to disconnect electrically the signal processing processor 203 from the LCD monitor 205 and to connect electrically the signal processing processor 203 to the electronic viewfinder 206. The switching is not limited to the above method, and thus the display switching unit 217 may switches the display of the LCD monitor 205 and the electronic viewfinder 206 based on a control signal from the CPU 211 or the like.

The display is switched between the LCD monitor and the electronic viewfinder. However, this arrangement is caused by a problem coming from a structural constraint, and thus the LCD monitor and the electronic viewfinder may display the same image simultaneously. In the case of the simultaneous display, an image to be displayed on the LCD monitor and an image to be displayed on the electronic viewfinder may be same or different.

The power supply 207 supplies a power to be consumed by the digital camera 1. The power supply 207 may be, for example, a dry battery, or a rechargeable battery. Further, the power supply 207 may be configured so that a power supplied from outside via a cable may be supplied to the digital camera 1.

The body mount 208 is a member that enables attachment/detachment to/from the interchangeable lens 3 in combination with the lens mount 301 of the interchangeable lens 3. The body mount 208 can be electrically connected to the interchangeable lens 3 by using a connection terminal or the like, and can be mechanically connected thereto by a mechanical member such as a locking member. The body mount 208 can output a signal from the lens controller 311 included in the interchangeable lens 3 to the CPU 211, and output a signal from the CPU 211 to the lens controller 311 of the interchangeable lens 3. That is, the CPU 211 can send/receive a control signal and information relating to the lens system to/from the lens controller 311 of the interchangeable lens 3.

The flash memory 209 is a recording medium to be used as an internal memory. The flash memory 209 can store image data or the image data subjected to the predetermined process. Further, the flash memory 209 can store a digitized audio signal. Further, the flash memory 209 can store a program and a setting value for controlling the CPU 211 as well as the image data and the audio signal.

Here, the flash memory 209 according to this embodiment stores a list of type IDs, used for identifying a type of the interchangeable lens mounted to the camera body 2. This list includes type IDs of interchangeable lenses which are adapted for shooting a moving image (refer to as "moving image adapted lenses"). The camera body 2 refers to the type ID acquired from the interchangeable lens 3 to determine whether the mounted interchangeable lens is the moving image adapted lens.

The card slot 210 is a slot for attaching/detaching a memory card 218 as a recording medium. The memory card 218 can also store image data or the image data subjected to the predetermined process, and a digitized audio signal.

The CPU 211 controls the operation of the camera body 2. The CPU 211 may be realized by a microcomputer, or a hard-wired circuit. That is, the CPU 211 performs various controls. The CPU 211 can exchange control signals with the lens controller 311. For example, the CPU 211 can send a control signal for controlling the diaphragm (for example, an F value or an AV value) and a control signal representing a drive speed of the diaphragm (a rate of change in an aperture value) to the lens controller 311.

The shutter switch 212 is a button provided on an upper surface of the camera body 2 and is an operation unit for detecting half-press and full-press operations by a user. When the shutter switch 212 receives the half-press operation from the user, it outputs a half-press signal to the CPU 211. On the other hand, when the shutter switch 212 receives the full-press operation from the user, it outputs a full-press signal to the CPU 211. The CPU 211 performs the various controls based on these signals.

The mode dial 216 selects one mode from a plurality of modes according to user's operation. The plurality of modes includes a moving image shooting mode, a still image shooting mode, and a playback mode. When one mode is selected according to the user's operation, the mode dial 216 sends information corresponding to the selected mode to the CPU 211. The CPU 211 controls the respective units of the camera body 2 based on the received information. The CPU 211 also sends a control signal to the interchangeable lens 3 to make the lens controller 311 control the respective units of the interchangeable lens 3. Further, a moving image shooting button 219 for a user to instruct shooting of a moving image is provided to an exterior of the camera body 2.

Figure 3:
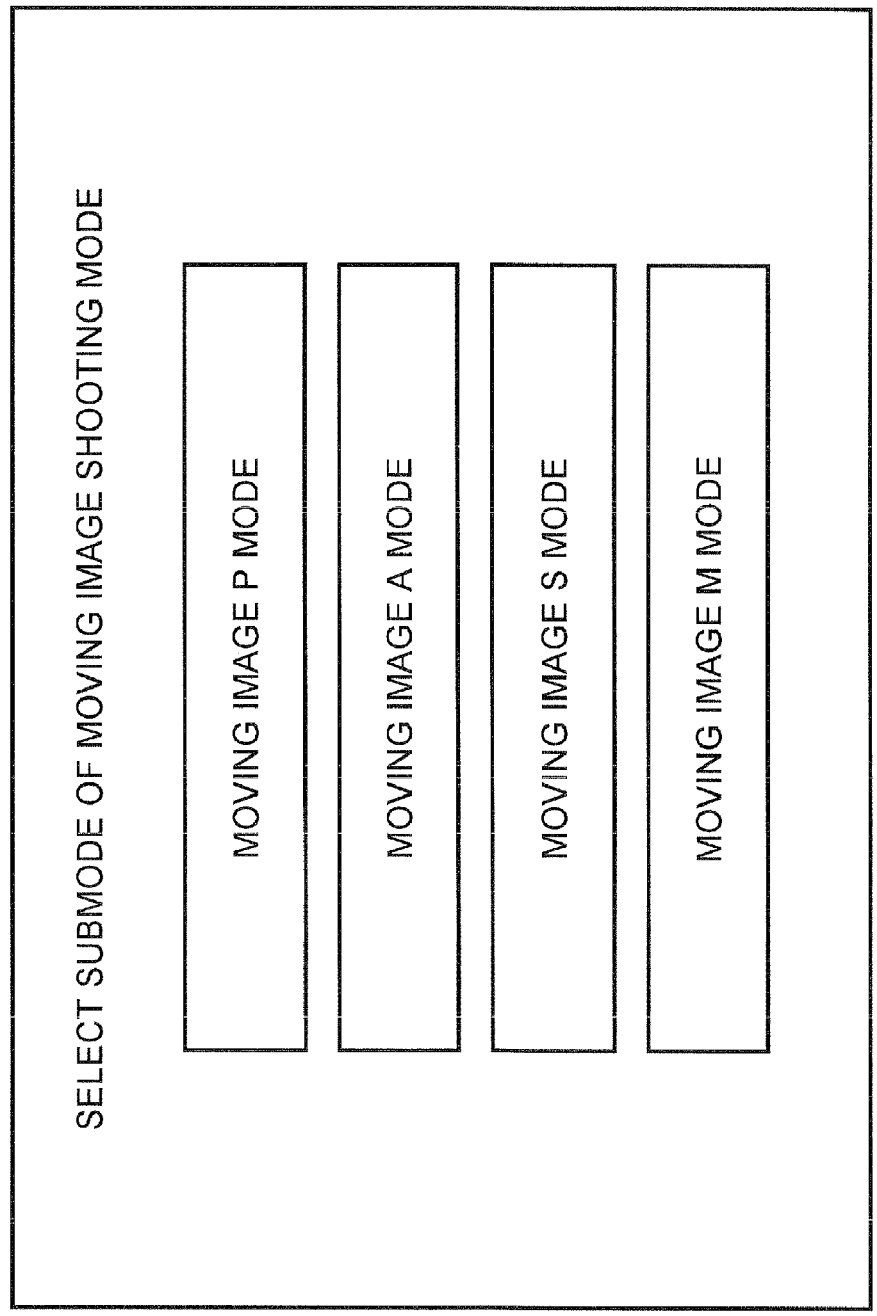
FIG. 3 is a diagram describing a setting of a sub-mode in a moving image shooting mode according to the first embodiment.

The moving image shooting mode is described below. The moving image shooting mode has a plurality of sub-modes. The plurality of sub-modes include "a moving image P mode", "a moving image A mode", "a moving image S mode", and "a moving image M mode". The user can set a mode on a selection screen displayed on the LCD monitor 205 through the CPU 211. FIG. 3 illustrates one example of the selection screen of the sub-modes displayed on the LCD monitor 205. The sub-modes are described below.

"The moving image P mode": in this mode, an aperture value, an exposure time, and sensitivity (sensitivity of AGC) are automatically adjusted in order to control the exposure during the shooting of a moving image.

"The moving image A mode": in this mode, the exposure time and sensitivity are automatically adjusted with an aperture value being fixed in order to control the exposure during the shooting of a moving image.

"The moving image S mode": in this mode, an aperture value and sensitivity are automatically adjusted with the exposure time being fixed in order to control the exposure during the shooting of a moving image. The automatic adjustment means to automatically adjust the respective units by means of the CPU 211.

"The moving image M mode": in this mode, an aperture value, an exposure time and sensitivity are (manually) adjusted according to a user's instruction (operation) in order to control the exposure during the shooting of a moving image.

It is noted that the sensitivity in each mode can be selectively set to be adjusted automatically or to be fixed by a user.

1-3. Configuration of the Interchangeable Lens

The lens system includes the zoom lens 303, the focus lens 304 and an objective lens 302, and collects light from a subject. The zoom lens 303 is driven by the zoom driver 305 or the zoom ring 309 to adjust zoom magnification. The focus lens 304 is driven by the focus driver 306 or the focus ring 310 to adjust focus. The focus lens 304 and the zoom lens 303 are movable lenses.

The zoom driver 305 drives the zoom lens 303 under the control of the lens controller 311. The focus driver 306 drives the focus lens 304 under the control of the lens controller 311.

The diaphragm 307 adjusts a quantity of light passing through the lens system. For example, a quantity of light can be regulated by increasing and decreasing an aperture composed of five blades or the like.

The diaphragm driver 308 changes the size of the aperture of the diaphragm 307. The diaphragm driver 308 can control the diaphragm 307 according to a drive speed included in a control signal from the lens controller 311.

In the first embodiment, the diaphragm driver 308 changes the size of the aperture of the diaphragm 307 under the control of the lens controller 311. Here, the size of the aperture can be specified based on the aperture value (F value) and the aperture value table. In this embodiment, the diaphragm driver 308 drives the diaphragm 307 under the control of the lens controller 311. The drive method is, however, not limited to this, and the diaphragm 307 may be driven by a mechanical method. In this case, an interlocking pin is provided to the body mount 208, and the diaphragm driver 308 receives a motion of the interlocking pin to drive the diaphragm 307. The interlocking pin is driven by a motor or the like controlled by the CPU 211.

The zoom ring 309 is provided to an exterior of the interchangeable lens 3, and drives the zoom lens 303 according to a user's operation. The focus ring 310 is provided to the exterior of the interchangeable lens 3, and drives the focus lens 304 according to a user's operation.

The lens controller 311 entirely controls the interchangeable lens 3. The lens controller 311 may be realized by a microcomputer, or by a hard-wired circuit. That is, the lens controller 311 performs various controls.

For example, when receiving a control signal of the diaphragm (aperture value and drive speed), the lens controller 311 controls the diaphragm driver 308 based on the aperture value and the drive speed. The diaphragm driver 308 drives the diaphragm 307 according to the control.

The flash memory 312 is a recording medium to be used as an internal memory. The flash memory 312 stores type IDs representing types of the interchangeable lens 3. The type IDs are sent to the CPU 211 of the camera body 2 by the lens controller 311.

The flash memory 312 stores information about a maximum speed and a minimum speed within a drivable range of the drive speed of the diaphragm. The maximum value and the minimum value of the drive speed can be sent to the CPU 211 by the lens controller 311.

When detecting that the interchangeable lens 3 is attached to the camera body 2, the lens controller 311 sends the information about the drive speed of the diaphragm to the CPU 211. When the interchangeable lens 3 is attached to the camera body 2, a power is supplied from the camera body 2 to the lens controller 311. Thus, the lens controller 311 detects that the power is supplied, and can send the information about the drive speed of the diaphragm.

2. Operation

One example of the operation of the digital camera 1 is described. The operation of the camera body 2 in the situation where the interchangeable lens 3, not yet being attached to the camera body 2, is attached to the camera body 2 is described below. The following describes a case where the sensitivity is automatically adjustable, but the sensitivity may be fixed.

2-1. Operation on Attaching Lens

Figure 4:
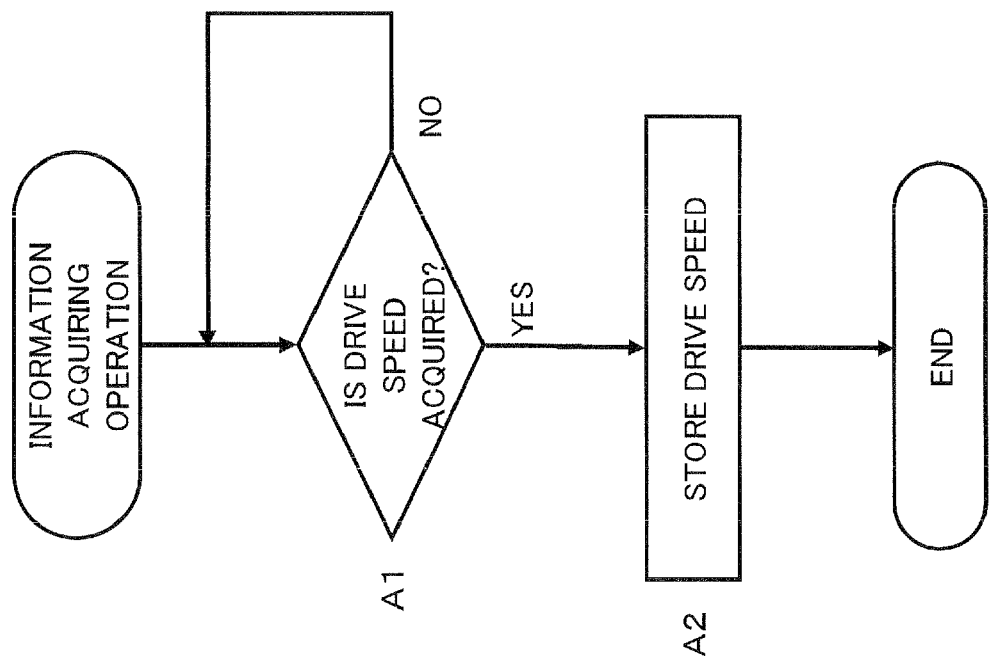
FIG. 4 is a flowchart describing an operational example of a camera body according to the first embodiment.

With reference to FIG. 4, the operation of the camera body 2 (CPU 211) when the interchangeable lens 3 is attached to the camera body 2 is described. When the lens controller 311 detects that the interchangeable lens 3 is attached to the camera body 2, the lens controller 311 sends the information about the drive speed to the CPU 211. When the interchangeable lens 3 is attached to the camera body 2, the CPU 211 determines whether the drive speed (the maximum value and the minimum value) is acquired from the lens controller 311 (A1). When the CPU 211 acquires the information about the drive speed, the CPU 211 stores the information in the flash memory 209 (A2).

2-2. Exposure Control Upon Shooting Moving Image

Figure 5:
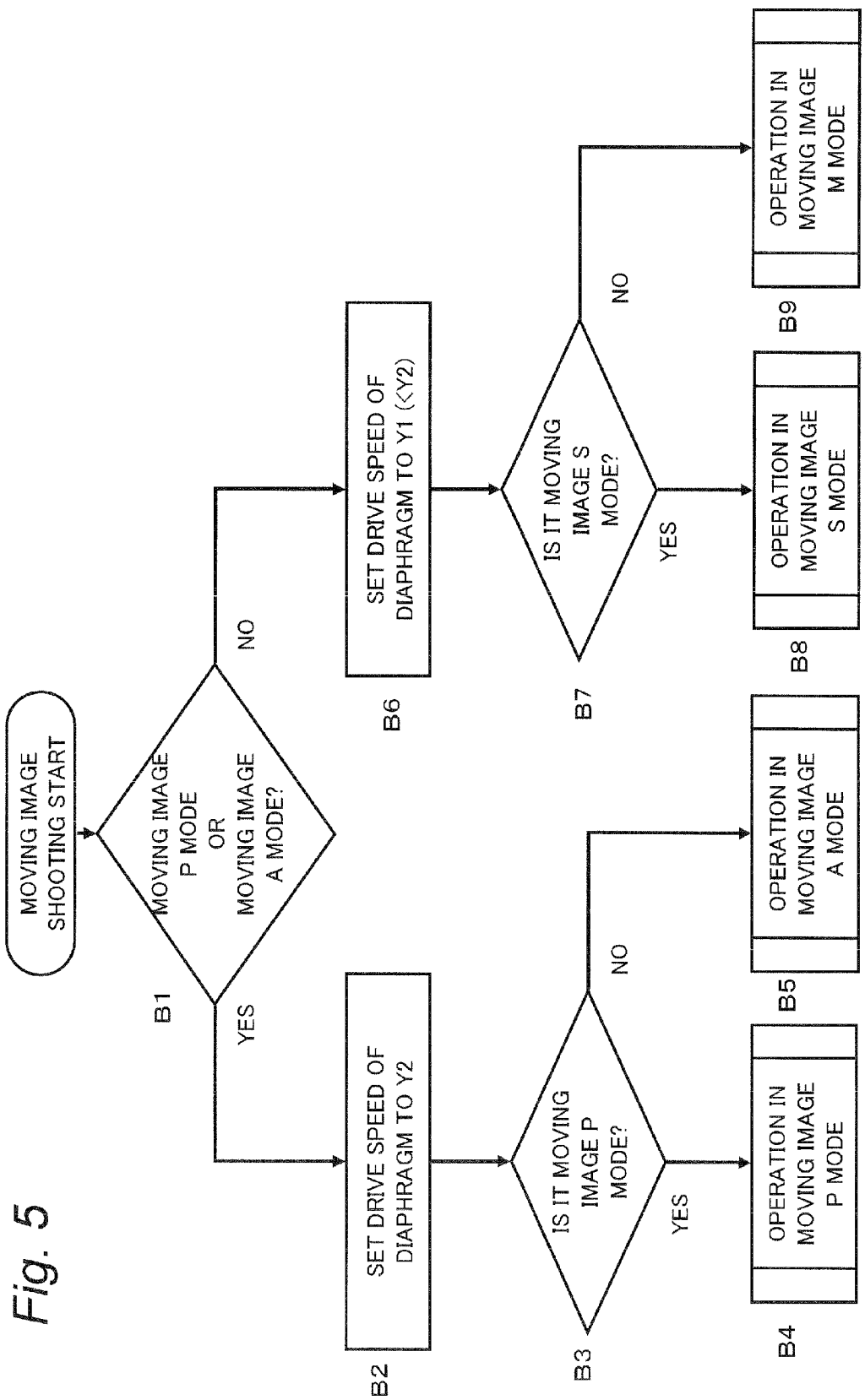
FIG. 5 is a flowchart describing an operational example of an interchangeable lens according to the first embodiment.

An exposure control operation upon shooting a moving image is described. When the moving image shooting button 219 is pressed down with the camera body 2 being set in the moving image mode, the CPU 211 of the camera body 2 starts to shoot a moving image. When the moving image shooting button 219 is again pressed down after the start of the shooting of the moving image, the CPU 211 ends the shooting of the moving image. With reference to FIG. 5, this operation is detailed below.

When the moving image shooting button 219 is pressed down, the CPU 211 determines whether the current sub-mode of the moving image mode is "the moving image P mode" or "the moving image A mode" (B1). When the sub-mode is "the moving image P mode" or "the moving image A mode", the CPU 211 sets the drive speed of the diaphragm to Y2 (B2). The drive speed Y2 is stored in the buffer memory 204. The drive speed Y2 is not limited to a particular value, but is set to a speed faster than a drive speed Y1, which is described later. In this embodiment, the CPU 211 stores the maximum value and the minimum value of the drive speed of the diaphragm acquired from the lens controller 311, and the drive speed Y2 may have a value between the minimum value and the maximum value of the drive speed.

Figure 6A:
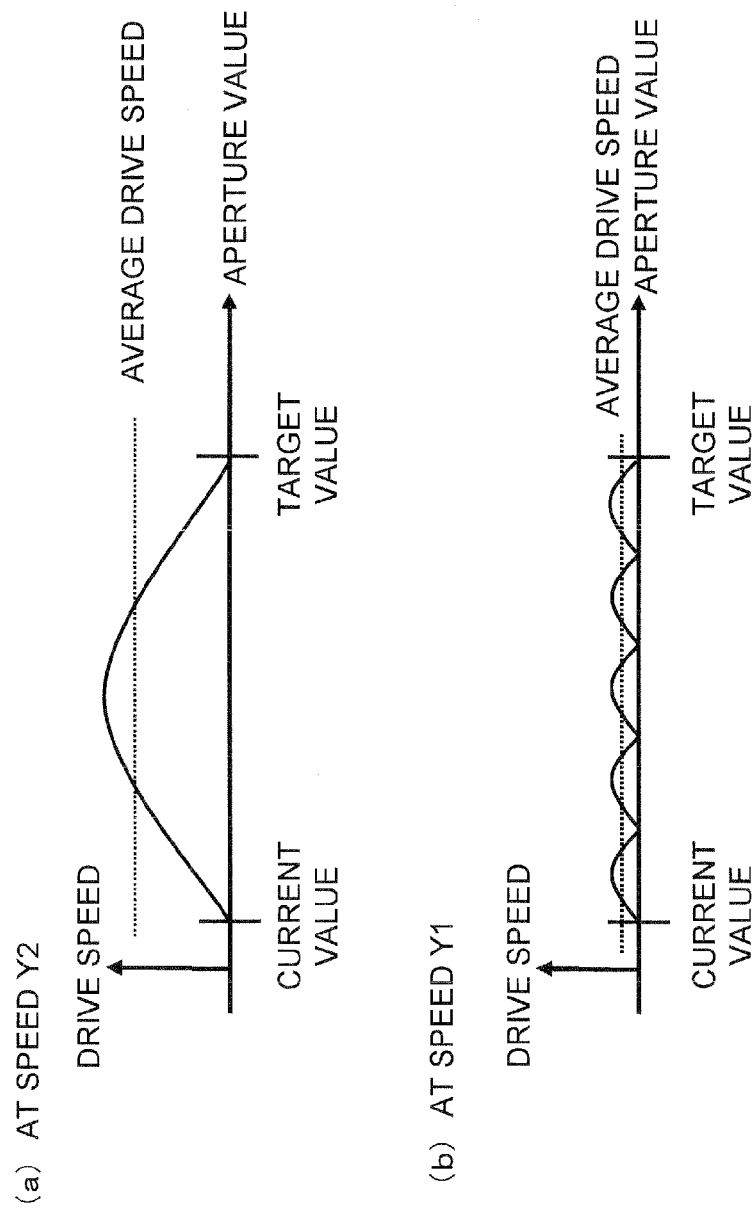
FIG. 6A is a diagram describing a drive speed of a diaphragm (control by adjusting number of times of driving).

With reference to FIGS. 6A and 6B, the drive of the diaphragm is described below. In this embodiment, a drive speed of the diaphragm is an average drive speed during a period from when driving of the diaphragm is started until when the aperture of the diaphragm reaches a target value. When the diaphragm is driven at the slower drive speed Y1, it takes longer time to reach a target value of the aperture after the starting of the drive of the diaphragm than when the diaphragm is driven at the faster drive speed Y2. Hence, the diaphragm changes more gently, thereby preventing an abrupt change in image quality.

The following methods can be considered as adjustment method of the drive speed of the diaphragm:

(1) adjusting the number of times of control of driving the diaphragm for changing the aperture value to a target value (see FIG. 6A); and (2) adjusting the drive speed of control of driving the diaphragm for changing the aperture value to a target value (see FIG. 6B).

In the case of (1), since the time required for one control is constant, the drive speed of the diaphragm can be adjusted by changing the number of times of the control. For example, in the case of the control at the faster drive speed Y1, as shown in FIG. 6A(a), the diaphragm is controlled to reach the target aperture value by means of one-time control. On the contrary, in the case of the control at the slower drive speed Y2, as shown in FIG. 6A(b), the diaphragm is controlled to reach the target aperture value by means of five-time controls. In this manner, the time for reaching the target aperture value is made longer by increasing the number of times of the control, so that the slower drive speed Y1 can be realized. Specifically, the camera body 2 drives the diaphragm by sending one control signal for the target aperture value to the interchangeable lens 3 when driving at the drive speed Y2, and the camera body 2 drives the diaphragm by sending five control signals for the target aperture value to the interchangeable lens 3 when driving at the drive speed Y1. In this manner, as shown in FIG. 6A, the average drive speed until the diaphragm reaches the target value can be controlled.

In the case of (2), different drive speed is realized as follows. The camera body 2 specifies the drive speed which is set to Y1 or Y2 for the interchangeable lens 3. In this manner, as shown in FIG. 6B, the drive speed of the diaphragm is controlled. In both manners of cases (1) and (2), the diaphragm which is driven at a drive speed Y2 can reach the target aperture value faster than when the diaphragm is driven at a drive speed Y1.

The camera body 2 has a target range (adequate exposure range) of the exposure control. The CPU 211 detects the brightness of the image data acquired by the CMOS sensor 201. The CPU 211 automatically controls aperture value, exposure time, sensitivity and the like based on the detected brightness according to the moving image mode so that the exposure to the CMOS sensor 201 becomes adequate, namely, the exposure falls within the target range of the exposure control. The width of the exposure target range in "the moving image S mode" may be set to be wider than the width of the exposure target range in the "moving image P mode" and "the moving image A mode". As a result, the aperture of the diaphragm can be controlled to an adequate value immediately in the "moving image S mode". That is, hunting can be decreased around the target exposure value. The hunting is, for example, that, in automatic adjustment of the diaphragm in the digital camera 1, the exposure state changes around the target exposure (on brightness side or dark side) since the exposure can not be controlled to fall in the target exposure range.

Returning to FIG. 5, the CPU 211 determines whether the sub-mode is "the moving image P mode" (B3). When the sub-mode is "the moving image P mode", the CPU 211 shifts to "the operation in the moving image P mode" (B4). On the other hand, when the sub-mode is not "the moving image P mode", namely, it is "the moving image A mode", the CPU 211 shifts to "the operation in the moving image A mode" (B5). "The operation in the moving image P mode" and "the operation in the moving image A mode" are described in detail later.

On the other hand, when the sub-mode is not "the moving image P mode" or "the moving image A mode" at step B1, the CPU 211 sets the drive speed of the diaphragm to Y1 (B6). Here, the drive speed Y1 is a lower value than the drive speed Y2. The drive speed Y1 is stored in the buffer memory 204.

Subsequently, the CPU 211 then determines whether the sub-mode is "the moving image S mode" (B7). When the sub-mode is "the moving image S mode", the CPU 211 shifts to "the operation in the moving image S mode" (B8). On the other hand, when the sub-mode is not "the moving image S mode", namely, it is "the moving image M mode", the CPU 211 shifts to "the operation in the moving image M mode" (B9). "The operation in the moving image S mode" and "the operation in the moving image M mode" are described in detail later.

As described above, in the mode possibly controlling the diaphragm alone for the exposure control such as "the moving image S mode" and "the moving image M mode", the drive speed (Y1) of the diaphragm is set to be slower than the drive speed (Y2) in the other modes ("the moving image P mode" and "the moving image A mode"). As a result, the change in the exposure state due to driving the diaphragm alone can be smoothened. On the other hand, like "the moving image P mode", when the diaphragm is adjusted, the exposure state can be gradually changed with parameters other than the aperture value. Therefore, the drive speed of the diaphragm can be set to be higher than that in "the moving image S mode" or the like. As a result, according to this embodiment, in the case of "the moving image P mode", the exposure state can be controlled to the target exposure state (brightness) in a short time.

2-3. Exposure Control Operation in Each Moving Image Mode

The exposure control operation in each moving image mode is described below.

2-3-1. Exposure Control Operation in Moving Image P Mode

With reference to FIG. 7, the exposure control operation in "the moving image P mode" is described.

The CPU 211 determines whether the interchangeable lens 3 attached to the camera body 2 is a moving image adapted lens (C1). For example, the CPU 211 compares a type ID stored in the flash memory 209 and acquired from the lens controller 311 with a type ID stored in the flash memory 209. When they match with each other, the CPU 211 determines that the interchangeable lens 3 is the moving image adapted lens.

When the CPU 211 determines that the interchangeable lens 3 is the moving image adapted lens, it determines whether the exposure state changes by a predetermined value (for example, 2 AV) or more (C2). As stated before, the CPU 211 checks the brightness of the image data acquired by the CMOS sensor 201, and determines whether the checked brightness of the image data changes, by the predetermined value or more, based on the brightness of the image data of the previous exposure control. Here, the brightness of the image data may be obtained by averaging the brightness of the entire image, or averaging a part of the image. Further, the image may be divided into a plurality of areas, the respective area may be weighed, and an average of the brightness of the respective weighed areas may be obtained. Since these methods are metering methods that are used in general, detailed description thereof is omitted.

When the exposure state changes by at least a predetermined value at step C2, the CPU 211 controls the aperture value, the exposure time and/or the sensitivity so that the adequate exposure is obtained (namely, the exposure falls within the target range) (C3). When controlling the diaphragm, the CPU 211 sends, to the lens controller 311, a value "Y2" read from the buffer memory 204 as the drive speed of the diaphragm. Here, when controlling the diaphragm, the CPU 211 may simultaneously control the exposure time. For example, when the diaphragm is driven to a full open side, the exposure time may be shortened, so that the exposure state gradually changes in the frame unit of the moving image. This results in a reduction of a great change in the exposure state due to low resolution of the diaphragm.

On the other hand, when it is determined at step C1 that the interchangeable lens 3 is not the moving image adapted lens, the CPU 211 determines whether the exposure state changes by at least the predetermined value similarly to step C2 (C4).

When the exposure state changes by at least the predetermined value at step C4, the CPU 211 controls the exposure time and/or the sensitivity prior to the aperture value so that the adequate exposure is obtained (C5). For example, the CPU 211 prevents the diaphragm from moving. Alternatively, the CPU 211 performs a control so that the number of operating points of the diaphragm is reduced in a program diagram. In such a manner, when the interchangeable lens not adapted for the moving image is attached to the camera body, a moving image as a non-preferable image can be prevented from being generated by controlling the diaphragm.

2-3-2. Exposure Control Operation in Moving Image A Mode

Figure 8:
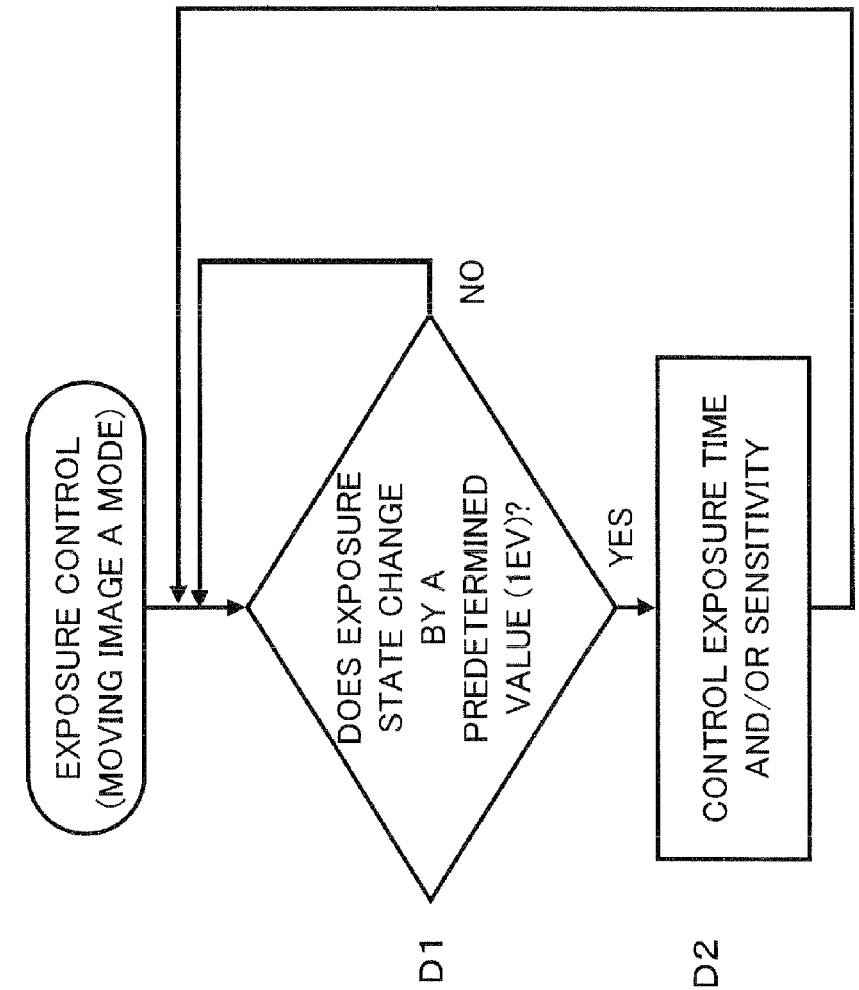
FIG. 8 is a flowchart illustrating the exposure control operation in a moving image A mode according to the first embodiment.

With reference to FIG. 8, the exposure control operation in "the moving image A mode" is described. The CPU 211 determines whether the exposure state changes by at least a predetermined value (for example, 1 EV), similarly to the step C2 (D1).

When the exposure state changes by at least the predetermined value at step D1, the CPU 211 controls the exposure time and/or the sensitivity so that the adequate exposure is obtained (D2).

With this control, since in "the moving image A mode" the exposure time can be automatically controlled with the diaphragm being fixed in shooting a moving image, the exposure state can be maintained with a depth of field being fixed.

2-3-3. Exposure Control Operation in Moving Image S Mode

Figure 9:
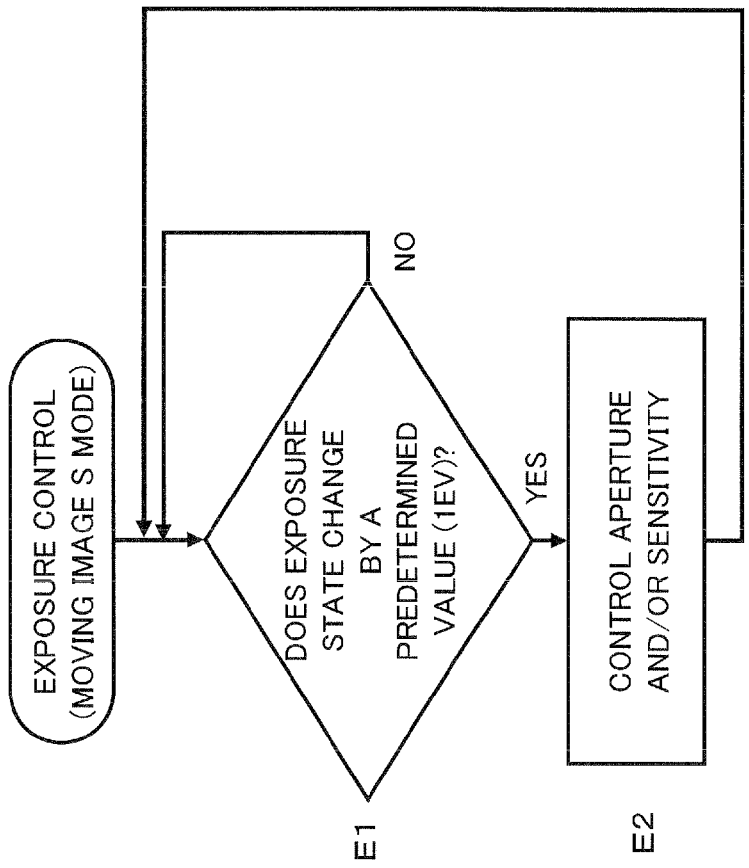
FIG. 9 is a flowchart illustrating the exposure control operation in a moving image S mode according to the first embodiment.

With reference to FIG. 9, the exposure control operation in "the moving image S mode" is described. The CPU 211 determines whether the exposure state changes by at least a predetermined value (for example, 1 EV) (E1).

When the exposure state changes by at least the predetermined value at step E1, the CPU 211 controls the aperture and/or the sensitivity so that the adequate exposure is obtained (E2). When controlling the aperture of the diaphragm, the CPU 211 sends, to the lens controller 311, a value "Y1" read from the buffer memory 204 as the drive speed of the diaphragm.

As a result, in "the moving image S mode", the aperture of the diaphragm can be automatically controlled with the exposure time being fixed in shooting the moving image.

2-3-4. Exposure Control Operation in Moving Image M Mode

In the moving image M mode, the CPU 211 controls respective parameters according to the aperture, the exposure time or the sensitivity set by a user. When controlling the aperture of the diaphragm, the CPU 211 sends, to the lens controller 311, a value "Y1" read as the drive speed of the diaphragm from the buffer memory 204.

Figure 10:
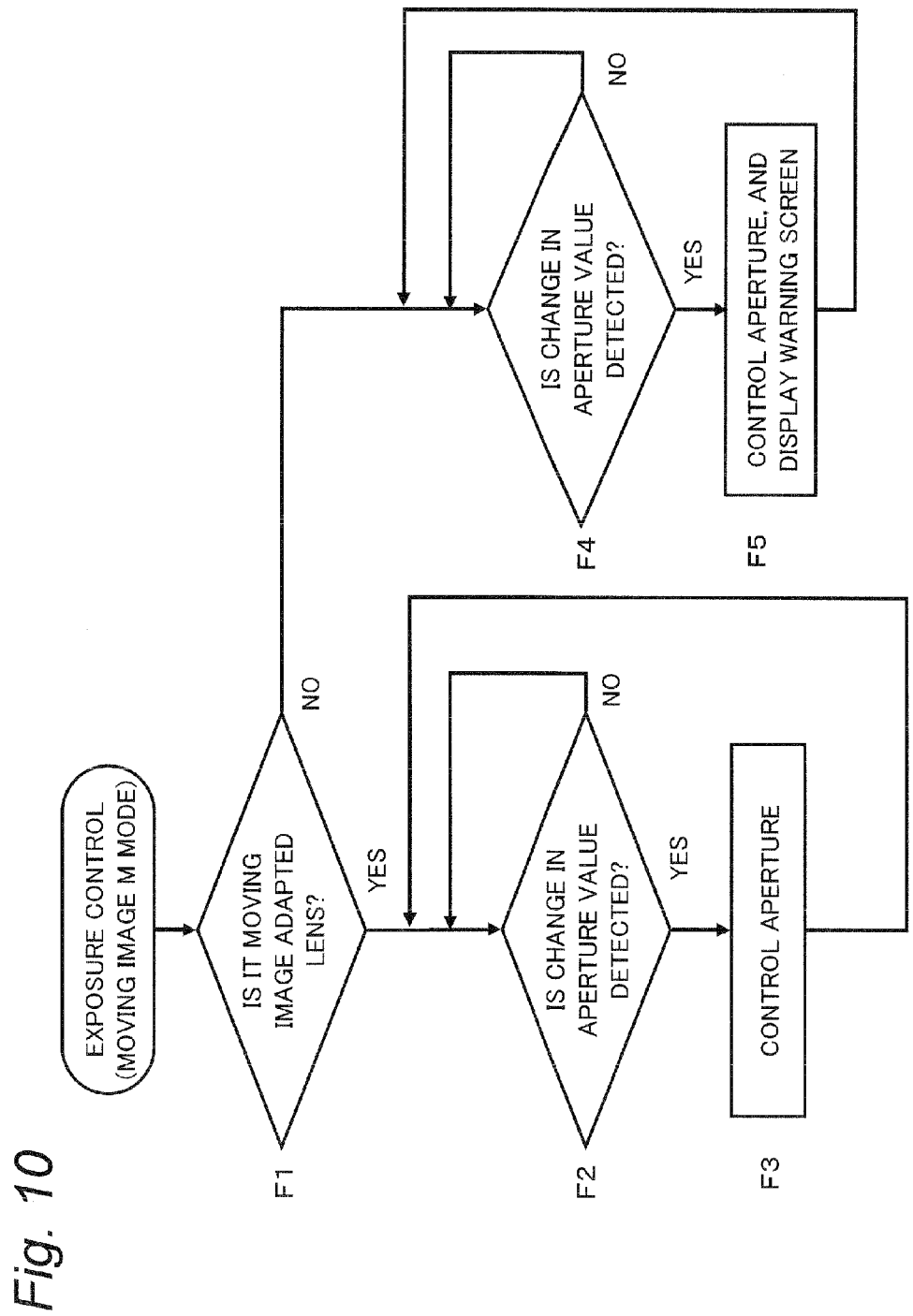
FIG. 10 is a flowchart illustrating the exposure control operation in a moving image M mode according to the first embodiment.

When controlling the aperture of the diaphragm, the CPU 211 may perform a control shown in FIG. 10. The CPU 211 determines whether the interchangeable lens 3 attached to the camera body 2 is the moving image adapted lens, similarly to step C1 (F1).

When determining that the interchangeable lens 3 attached to the camera body 2 is the moving image adapted lens, the CPU 211 detects a change in the aperture value that is caused by the user's operation (F2). For example, when the operation member provided to the exterior is operated by the user, the CPU 211 can detect that the aperture value is changed.

When the change in the aperture value is detected at step F2, the CPU 211 controls the diaphragm (F3). When the CPU 211 controls the diaphragm, it sends to the lens controller 311, a value "Y1" read as the drive speed of the diaphragm from the buffer memory 204.

On the other hand, when the CPU 211 determines at step F1 that the interchangeable lens 3 attached to the camera body 2 is not the moving image adapted lens, the CPU 211 detects the change in the aperture value caused by the user's operation similarly to step F2 (F4).

When the change in the aperture value is detected at step F4, the CPU 211 controls the diaphragm according to the aperture value set by the user's operation, and displays a warning screen (F5). As the warning screen, an annunciation image may be possible for informing that, for example, change of the aperture value may cause a adverse effect on a moving image, such as disturbance of the moving image. In such a manner, the user can recognize that the moving image is likely disturbed because the interchangeable lens is not adapted for the moving image. When controlling the diaphragm, the CPU 211 sends, to the lens controller 311, a value "Y1" read as the drive speed of the diaphragm from the buffer memory 204.

3. Correspondence of Terms

The CMOS sensor 201 is one example of an imaging unit. The CPU 211 is one example of a detector, a sending unit, setting unit, and a controller. The moving image P mode is one example of a first mode. The moving image S mode is one example of a second mode. The selection screen displayed on the LCD monitor 205 by the CPU 211 is one example of a mode setting unit.

4. Conclusion

In this embodiment, the camera body 2 to which the interchangeable lens 3 can be mounted includes the CMOS sensor 201 which captures light incident via the interchangeable lens 3 to generate image data, and the CPU 211 which detects quantity of the light incident via the interchangeable lens 2. The CPU 211 sets the aperture value and the drive speed of the diaphragm 307 of the interchangeable lens 3, and exposure condition which is a setting for exposure other than settings of the diaphragm 307, and sends the control signals for controlling the set aperture value and drive speed of the diaphragm to the interchangeable lens. Further, the selection screen displayed on the LCD monitor 205 by the CPU 211 selects one of the plurality of operating modes. The plurality of operating modes includes the first mode and the second mode. In the first mode, the diaphragm 307 and the exposure condition are automatically adjusted according to the light quantity detected by the CPU 211 during the shooting of a moving image. In the second mode, the diaphragm 307 is automatically adjusted with the exposure condition being fixed according to the light quantity detected by the CPU 211 during the shooting of a moving image. The average drive speed of the diaphragm 307 for the automatic adjustment in the second mode is slower than the average drive speed of the diaphragm for the automatic adjustment in the first mode.

With this constitution, the camera body 2 prevents the abrupt change in the exposure to control the adequate exposure, and thus can shoot a moving image preferable for the user. It is noted that, as the drive speed of the diaphragm is slower, the change rate of light quantity which changes upon the drive of the diaphragm becomes smaller. On the other hand, as the drive speed of the diaphragm is faster, the change rate of light quantity which changes upon the drive of the diaphragm becomes larger. Therefore the camera body can prevent the abrupt change in the exposure.

The above example describes the imaging apparatus having the camera body with the interchangeable lens, but the concept of this embodiment can be applied also to an imaging apparatus such as a compact camera in which a lens and a body are integral.

5. Other Embodiments

The first embodiment is descried above as the typical embodiment, however not limited to this. The basic concept of the first embodiment is applicable to other embodiments modified appropriately.

According to the first embodiment, in shooting (capturing and recording) a moving image, the drive speed of the diaphragm in the "moving image S mode" is set slower than that in the "moving image A mode". That is, when a through image is being displayed and a moving image is not recorded, the above stated control is not performed. Only during shooting a moving image, the above stated control may be performed so that the drive speed of the diaphragm before shooting a moving image always can be fixed to higher speed to achieve high speed aperture control. Thus a time required for the diaphragm changing to a state providing appropriate exposure can be reduced before start of shooting a moving image so that the exposure can be controlled more appropriately before start of shooting a moving image. However, not only during shooting (capturing and recording) a moving image, but during whole period of capturing a moving image, the above stated control may be performed. That is, even when the digital camera 1 is displaying a through image (image data captured by the CMOS sensor) on the LCD monitor and a moving image is not recorded, the above stated control may be performed.

According to the first embodiment, when the exposure state changes by at least a predetermined value (for example, 1EV), the exposure control is performed. However, not limited to this, when the exposure state changes by at least a value according to the moving image mode (⅓EV to ⅔EV), the exposure control may be performed.

INDUSTRIAL APPLICABILITY

The embodiment can be applied to an imaging apparatus of which exposure can be automatically adjusted. For example, the embodiment can be applied to a digital still camera to which an interchangeable lens can be attached, a compact camera, a camcorder, and the like.

What is claimed is:

1. A camera body to which an interchangeable lens can be attached, comprising:
   an imaging unit operable to generate image data from an optical signal obtained from the interchangeable lens;
   a detector operable to detect a light quantity of the optical signal obtained from the interchangeable lens;
   a controller operable to set an aperture value of a diaphragm of the interchangeable lens and an exposure condition which is a setting relating to exposure other than a setting of the diaphragm;
   a sending unit operable to send a control signal used for control with the aperture value set by the controller, to the interchangeable lens; and
   a mode setting unit operable to select an operating mode from a plurality of operating modes, wherein
   the plurality of operating modes includes a first mode for adjusting the aperture value of the diaphragm and the exposure condition according to the light quantity detected by the detector during capturing of a moving image, and a second mode for adjusting the aperture value of the diaphragm with the exposure condition being fixed according to the light quantity detected by the detector during capturing of the moving image, and
   an average drive speed of the diaphragm for adjusting the aperture value of the diaphragm in the second mode is slower than an average drive speed of the diaphragm for adjusting the aperture value of the diaphragm in the first mode.

2. The camera body according to claim 1, wherein
   the controller adjusts the aperture value of the diaphragm and the exposure condition in the first mode and adjusts the aperture value of the diaphragm with the fixed exposure condition in the second mode, based on the light quantity detected by the detector so that an exposure amount of the imaging unit falls within a predetermined target range, and
   a width of the predetermined target range in the second mode is larger than a width of the predetermined target range in the first mode.

3. The camera body according to claim 1, wherein the exposure condition includes at least one of an exposure time or a sensitivity of the imaging unit.

4. The camera body according to claim 1, wherein the controller sets the average drive speed of the diaphragm in the second mode to be slower than the average drive speed of the diaphragm in the first mode, only when the image data generated by the imaging unit is recorded in a predetermined recording medium.

5. An imaging apparatus comprising:
   an optical system including a diaphragm;
   a diaphragm driver operable to drive the diaphragm;
   an imaging unit operable to generate image data from an optical signal obtained from the optical system;
   a detector operable to detect a light quantity of the optical signal obtained from the optical system;
   a controller operable to set an aperture value of the diaphragm and an exposure condition which is a setting relating to exposure other than a setting of the diaphragm; and
   a mode setting unit operable to select an operating mode from a plurality of operating modes, wherein
   the plurality of operating modes includes a first mode for adjusting the aperture value of the diaphragm and the exposure condition according to the light quantity detected by the detector during capturing of a moving image, and a second mode for adjusting the aperture value of the diaphragm with the exposure condition being fixed according to the light quantity detected by the detector during capturing of the moving image, and
   an average drive speed of the diaphragm for adjusting the aperture value of the diaphragm in the second mode is slower than an average drive speed of the diaphragm for adjusting the aperture value of the diaphragm in the first mode.

6. The imaging apparatus according to claim 5, wherein
   the controller adjusts the aperture value of the diaphragm and the exposure condition in the first mode and adjusts the aperture value of the diaphragm with the fixed exposure condition in the second mode, based on the light quantity detected by the detector so that an exposure amount of the imaging unit fails within a predetermined target range, and
   a width of the target range in the second mode is larger than a width of the target range in the first mode.

7. The imaging apparatus according to claim 5, wherein the exposure condition includes at least one of an exposure time or a sensitivity of the imaging unit.

8. The imaging apparatus according to claim 5, wherein the controller sets the average drive speed of the diaphragm in the second mode to be slower than the average drive speed of the diaphragm in the first mode, only when the image data generated by the imaging unit is recorded in a predetermined recording medium.

* * * * *

UNITED STATES PATENT AND TRADEMARK OFFICE
CERTIFICATE OF CORRECTION

| | |
|---|---|
| PATENT NO. | : 8,000,596 B2 |
| APPLICATION NO. | : 12/713383 |
| DATED | : August 16, 2011 |
| INVENTOR(S) | : Koji Hashigami and Koji Shibuno |

It is certified that error appears in the above-identified patent and that said Letters Patent is hereby corrected as shown below:

Column 14, line 42 (Claim 6): "the imaging unit fails..." should read "the imaging unit falls...".

Signed and Sealed this
Tenth Day of January, 2012

David J. Kappos
*Director of the United States Patent and Trademark Office*